United States Patent
Akikuni et al.

(10) Patent No.: US 6,775,005 B2
(45) Date of Patent: Aug. 10, 2004

(54) LOW-COHERENCE REFLECTOMETER WITH POLARIZATION CONTROL

(75) Inventors: Fumio Akikuni, Tokyo (JP); Shoichi Aoki, Tokyo (JP); Tetsuo Yano, Tokyo (JP); Tohru Mori, Tokyo (JP); Kazumasa Takada, Tokyo (JP)

(73) Assignees: Ando Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 250 days.

(21) Appl. No.: 10/084,407

(22) Filed: Feb. 25, 2002

(65) Prior Publication Data

US 2002/0118363 A1 Aug. 29, 2002

(30) Foreign Application Priority Data

Feb. 26, 2001 (JP) .................................. P. 2001-050421

(51) Int. Cl.[7] ............................................... G01B 9/02
(52) U.S. Cl. ........................ 356/479; 356/497; 356/491
(58) Field of Search ................................ 356/479, 497, 356/477, 491, 73.1; 385/12; 250/227.19, 227.27, 227.17

(56) References Cited

U.S. PATENT DOCUMENTS 6,233,055 B1 * 5/2001 Mandella et al. ............ 356/479
6,476,919 B1 * 11/2002 Mori et al. .................. 356/479

* cited by examiner

*Primary Examiner*—Samuel A. Turner
*Assistant Examiner*—Patrick Connolly
(74) *Attorney, Agent, or Firm*—Fish & Richardson P.C.

(57) ABSTRACT

A photocoupler 3 splits the light from a low-coherence light source 1 into measuring light DL and local oscillator light KL. A photocoupler 5 receives measuring light DL arid is input to an optical circuit 7 to be measured. The photocoupler 5 splits the reflected light RL. A polarization controller 9 controls the state of polarization of the reflected light RL as split by the photocoupler 5. A photocoupler 13 allows local oscillator light KL to be incident on a reflector mirror 16 and splits local oscillator light KL. A photocoupler 11 combines the reflected light RL as controlled in the state of polarization by the polarization controller 9, with the local oscillator light KL.

12 Claims, 4 Drawing Sheets

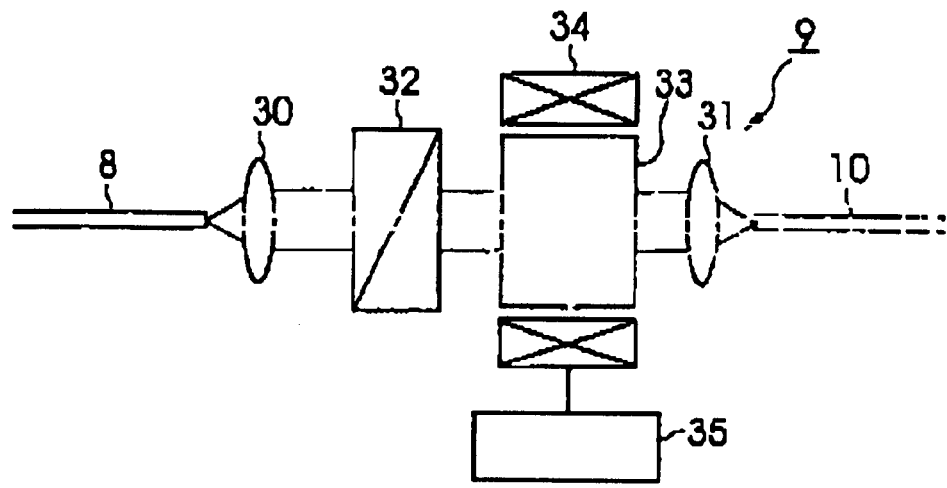
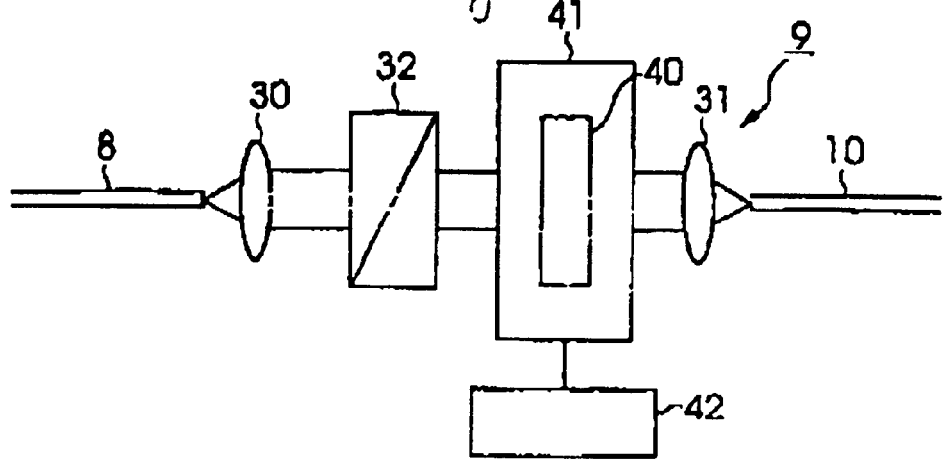
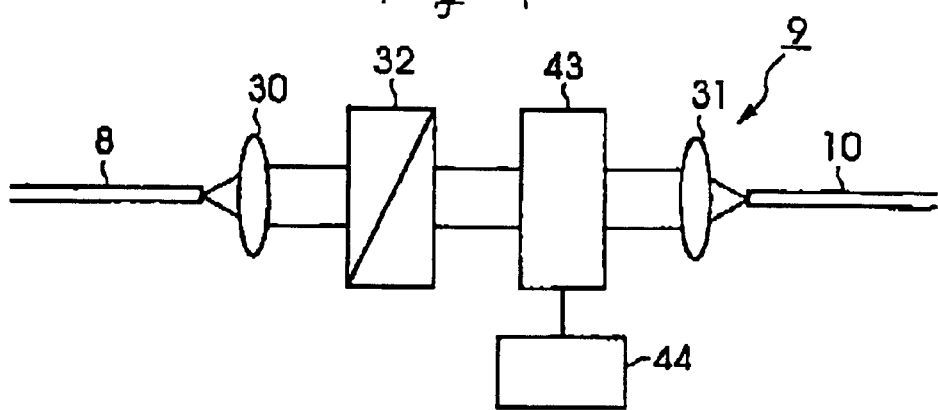

LOW-COHERENCE REFLECTOMETER WITH POLARIZATION CONTROL

BACKGROUND OF THE INVENTION

1. Field of the Invention

The present invention relates to a low-coherence reflectometer which uses low-coherence light to measure the reflectance or its distribution in various optical circuits including light guides and optical modules.

2. Description of the Related Art

FIG. 5 is a block diagram showing an outline for the construction of a conventional low-coherence reflectometer. In FIG. 5, numeral 100 represents a low-coherence light source in the form of a light-emitting diode issuing low-coherence light. An end of an optical fiber 101 is connected to the exit end of the low-coherence light source 100. Reference numeral 102 represents a photocoupler having four ports 102a–102d and the other end of optical fiber 101 is connected to the port 102a. A photocoupler 102 receives low-coherence light as an input to the port 102a and splits it at a specified intensity ratio (say, 1:1) into two beams which exit from the ports 102b and 102c. One end of an optical fiber 103 is connected to the port 102b. Connected to the other end of the optical fiber 103 is an optical circuit 104 to be measured.

An optical fiber 105 is connected to the port 102c of the photocoupler 102 and a fiber-type optical isolator 106 is connected to the other end of the optical fiber 105. A fiber-type optical isolator 106 has such characteristics that the input light from the optical fiber 105 is transmitted to an optical fiber 107 connected at the exit end but that the input light from optical fiber 107 is blocked against transmission to the optical fiber 105. The other end of the optical fiber 107 is connected to a port 108a of a photocoupler 108. An optical fiber 109 is connected to a port 108b of the photocoupler 108. Numeral 110 represents a collimator lens preset to have a focal position at the end 109a of the optical fiber 109; numeral 111 represents a reflector mirror for reflecting the light incident via the collimator lens 110 and it is mounted on a stage (not shown) for adjusting the distance to collimator lens 110, An end of an optical fiber 112 is connected to port 108c of the photocoupler 108.

An end of an optical fiber 113 is connected to the port 102d of the photocoupler 102 and the other end of optical fiber 113 is connected to a polarization controller 114. Polarization controller 114 controls the state of polarization of the input light from optical fiber 113. An optical fiber 115 is connected to the exit end of the polarization controller 114. Numeral 116 represents a photocoupler having four ports 116a–116d; connected to the port 116a is the other end of the optical fiber 112 of which an end is connected to the photocoupler 108, and the optical fiber 115 is connected to the port 116b. The photocoupler 116 combines the input light to port the 116a with the input light to the port 116b and issues two beams that exit from the ports 116c and 116d in a specified intensity ratio (say, 1:1). Optical fibers 117 and 118 are connected to the ports 116c and 116d, respectively; the light travelling through optical fiber 117 is subjected to photoelectric conversion by a light-receiving device 119 and the light travelling through the optical fiber 118 is subjected to photoelectric conversion by a light-receiving device 120. Numeral 121 represents a differential amplifier which amplifies the difference between the electrical signals output from the light-receiving devices 119 and 120.

The conventional low-coherence reflectometer having the above-described construction operates as follows. First, the low-coherence light issuing from the low-coherence light source 100 is split by the photocoupler 102 and one branch of the coupler output is picked up as measuring light and launched into the optical circuit 104 via the optical fiber 103, The reflected light produced in the optical circuit 104 is input to the port 102b of the photocoupler 102 via the optical fiber 103 and exits from the port 102d of the photocoupler 102. The reflected light emerging from the photocoupler 102 passes through the polarization controller 114 and is input to the port 116b of the photocoupler 116 via the optical fiber 115.

The other branch of the output light from the photocoupler 102 travels through the optical fiber 105 as local oscillator light and is transmitted through the fiber-type optical isolator 106; thereafter, it is input to the port 108a of the photocoupler 108 via the optical fiber 107. The local oscillator light passes through the photocoupler 108 and optical fiber 109 and exits from its end 109a; the emerging light is converted to parallel light by the collimator lens 110 and incident on the reflector mirror 111. The local oscillator light is then reflected by the reflector mirror 111, converged by the collimator lens 110 and launched into the optical fiber 109 at its end 109a. The local oscillator light entering the optical fiber 109 travels through the photocoupler 108 and optical fiber 112 in that order and is input to the port 116a of the photocoupler 116.

The photocoupler 116 combines the reflected light input to the port 116b with the local oscillator light input to the port 116a. If the optical paths of the measuring light and the reflected light coincide with the optical path of the local oscillator light, interference occurs within the photocoupler 116. The respective branches of the combined light are subjected to photoelectric conversion by the light-receiving devices 119 and 120 and the resulting electrical signals are processed by the differential amplifier 121.

If the stage (not shown) is moved so that the reflector mirror 111 is moved along the optical axis at uniform speed to change the pathlength of the local oscillator light issuing from the photocoupler 108, the amount of group retardation of the local oscillator light is changed. Hence, for each position of the reflector mirror 111, the polarization controller 114 is operated to set the state of polarization of the reflected light to linear polarization at θ=0° (as being parallel to the paper) and at θ=90° (as being perpendicular to the paper) and the intensities of the corresponding beat signals $I_0$ and $I_{90}$ are measured with the differential amplifier 121 and their sum $I_0+I_{90}$ is calculated; in this way, the optical power of the reflected light for each point in the optical circuit 104 can be measured independently of the state of polarization of the reflected light and the local oscillator light, thus making it possible to measure the reflectance distribution. For details of the technology outlined above, see Japanese Patent Laid-Open No. 97856/2000, for example.

In the conventional low-coherence reflectometer described above, the fiber-type optical isolator 106 is provided between the photocouplers 102 and 108 and this is in order to ensure that during measurement of the reflectance distribution in the optical circuit 104, one branch of the local oscillator light emerging from photocoupler the 108 after reflection by the reflector mirror 111 and then travelling through the optical fiber 107 will not reach photocoupler the 102 to be combined there with the reflected light occurring within the optical circuit 104. However, due to the provision of the fiber-type optical isolator 106, the optical path of the local oscillator light starting with the issuance from the port 102c of the photocoupler 102 and ending at the photocoupler 116 where it is combined with the reflected light consists, in the order written, of the optical fiber 105, fiber-type optical isolator 106, optical fiber 107, photocoupler 108, optical fiber 109, collimator lens 110, reflector mirror 111, collimator lens 110, optical fiber 109, photocoupler 108 and optical fiber 112. This is quite a long optical path.

As already mentioned, if the optical paths of the measuring light and the reflected light up to the photocoupler 116 coincide with the optical path of the local oscillator light up to the photocoupler 116, interference occurs within the photocoupler 116. The fiber-type optical isolator 106 provided in the optical path of the local oscillator light causes a corresponding increase in the length of that path. As a result, an optical fiber having a length comparable to the pathlength of the fiber-type optical isolator 106 need be provided in the optical paths of the measuring light and the reflected light. Thus, in the prior art, the prolonged optical fibers are employed and this has caused the problem of increasing the complexity in length adjustment, the layout of components in the apparatus, etc., with the added increase in production cost.

SUMMARY OF THE INVENTION

The present invention has been accomplished under these circumstances. An object of the invention is to provide a low-coherence reflectometer in which the overall optical pathlength is shortened to not only facilitate the adjustment of the optical pathlength but also reduce the production cost through simplification of the apparatus and which still is capable of correct measurement of the reflectance distribution and the power of the reflected light.

In order to attain the stated object, the present invention provides a low-coherence reflectometer comprising a light source, a first splitting unit that splits the light from the light source, a second splitting unit by means of which one branch of the output light from the first splitting unit is input as measuring light into an optical circuit to be measured and which splits the reflected light obtained by inputting the measuring light into the optical circuit to be measured, a polarization control unit for controlling the state of polarization of the reflected light as split by the second splitting unit, a third splitting unit by means of which the other branch of the output light from the first splitting unit is allowed to be incident on a reflector mirror as local oscillator light and which splits the local oscillator light reflected by the reflector mirror, and a coupling unit by means of which the reflected light as controlled in the state of polarization by the polarization control unit is combined with the local oscillator light split by the third splitting unit.

The invention also provides a low-coherence reflectometer comprising a light source, a first splitting unit that splits the light from the light source, a second splitting unit by means of which one branch of the output light from the first splitting unit is input as measuring light into an optical circuit to be measured and which splits the reflected light obtained by inputting the measuring light into the optical circuit to be measured, a third splitting unit by means of which the other branch of the output light from the first splitting unit is allowed to be incident on a reflector mirror as local oscillator light and which splits the local oscillator light reflected by the reflector mirror, a polarization control unit for controlling the state of polarization of the reflected light as split by the third splitting unit, and a coupling unit by means of which the reflected light as split by the second splitting unit is combined with the local oscillator light as controlled in the state of polarization by the polarization control unit.

In a preferred embodiment of the invention, the polarization control unit sets the state of polarization in two orthogonal directions.

In another preferred embodiment of the invention, the low-reflectance reflectometer further includes a stage for moving the reflector mirror along the optical axis of the local oscillator light.

In yet another embodiment of the invention, the polarization control unit comprises a Faraday rotator, a coil portion for applying a magnetic field to the Faraday rotator in the direction of light propagation, and a current control portion for controlling the current to the coil portion.

In a further embodiment of the invention, the polarization control unit comprises a half-wave plate and a rotating mechanism for rotating the half-wave plate in a plane orthogonal to the optical axis.

In a still another embodiment of the invention, the polarization control unit comprises a liquid-crystal device capable of setting the pathlength difference between the two principal axes to either zero or half the wavelength and a power supply for adjusting the voltage to the liquid-crystal device.

BRIEF DESCRIPTION OF THE DRAWINGS

FIG. 2 shows a first example of the construction of the polarization controller 9.

FIG. 3 shows a second example of the construction of the polarization controller 9.

FIG. 4 shows a third example of the construction of polarization controller 9.

DETAILED DESCRIPTION OF THE PRESENT INVENTION

Figure 1:
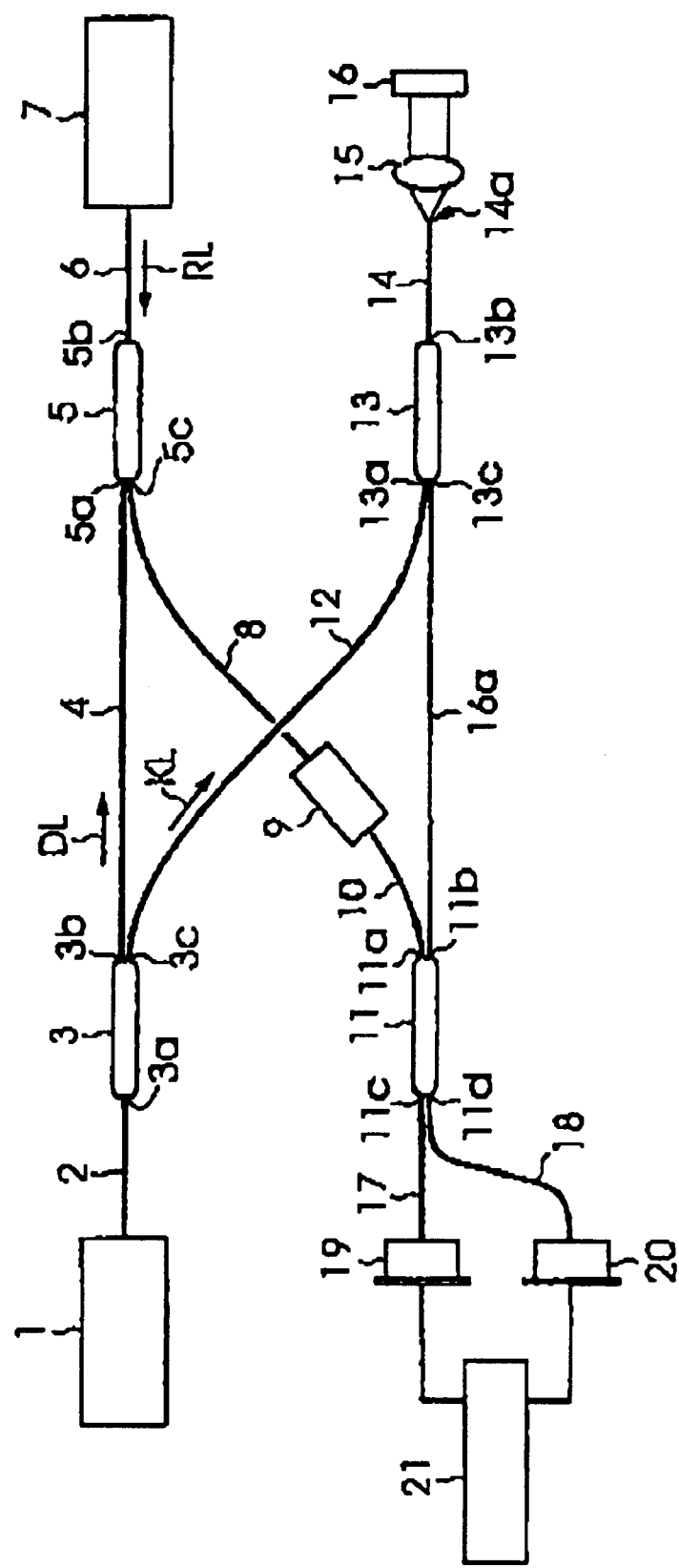
FIG. 1 is a block diagram showing an outline for construction of a low-coherence reflectometer according to an embodiment of the invention.

A low-coherence reflectoneter according to an embodiment of the invention is described below in detail with reference to drawings. FIG. 1 is a block diagram showing an outline for the construction of the low-coherence reflectometer according to an embodiment of the invention. In FIG. 1, numeral 1 represents a low-coherence light source in the form of a light-emitting diode issuing low-coherence light. An end of an optical fiber 2 is connected to the exit end of the low-coherence light source 1. Reference numeral 3 represents a photocoupler having three ports 3a–3c and the other end of the optical fiber 2 is connected to the port 3a. The photocoupler 3 receives the low-coherence light as an input to the port 3a and splits it at a specified intensity ratio (say, 1:1) into two beams which exit from the ports 3b and 3c. One end of an optical fiber 4 is connected to the port 3b of the photocoupler 3.

Numeral 5 represents a photocoupler having three ports 5a–5c. The other end of the optical fiber 4 is connected to port 5a of the photocoupler 5 and one end of an optical fiber 6 is connected to the port 5b; connected to the other end of the optical fiber 6 is an optical circuit 7 to be measured. An end of an optical fiber 8 is connected to the port 5c of the photocoupler 5 and a polarization controller 9 is connected to the other end of the optical fiber 8. The polarization controller 9 controls the state of polarization of the input light from the optical fiber 8; in particular, it controls the state of polarization of the reflected light to linear polarization at θ=0° (as being parallel to the paper) and at θ=90° (as being perpendicular to the paper).

The construction of the polarization controller 9 is described below with reference to several examples. FIG. 2 shows a first example of the construction of the polarization controller 9. In FIG. 2, numerals 8 and 10 represent optical fibers, 30 and 31 are collimator lenses, 32 is a polarizer, 33 is a Faraday rotator, 34 is a coil, and 35 is a controller of the current to the coil 34. The light emerging from the optical fiber 8 is converted to parallel light by the collimator lens 30. Since this parallel light is substantially unpolarized, half its optical power can pass through the polarizer 32 and the transmissive optical power is independent of the state of the optical fibers in the fiber-optics delay lines and other parts. The linearly polarized parallel light propagates through the Faraday rotator 33 and is then converged by the collimator lens 31 to be launched into the optical fiber 10.

If no current is impressed on the coil 34 wound around the Faraday rotator 33, the linearly polarized light from the polarizer 32 is launched as such into the optical fiber 10. If current is impressed on the coil 34 from the controller 35, a magnetic field is applied in the longitudinal direction of the Faraday rotator 33, rotating the direction of linear polarization of the propagating light. If it is supposed that a current of 35 mA impressed on the coil can rotate the linear polarization by 90 degrees, the direction of the linearly polarized light to be launched into the optical fiber 10 can be adjusted to θ=0° or θ=90° by setting the current impression on the coil 34 to either 0 mA or 35 mA.

FIG. 3 shows a second example of the construction of the polarization controller 9. In FIG. 3, numeral 40 represents a half-wave plate, 41 is a rotating holder for rotating half-wave plate 40 in a plane perpendicular to a light beam, and 42 is a controller of the holder. By bringing the direction of one principal axis of the half-wave plate 40 into agreement with the direction in which the polarizer 32 transmits the linearly polarized light, the condition for no change in the direction of polarization of the linearly polarized light, namely, θ=0° can be realized. On the other hand, if the direction of the principal axis of the half-wave plate 40 is set at 45 degrees with respect to the direction in which the polarizer 32 transmits the linearly polarized light, the linearly polarized light passing through the polarizer 32 undergoes a rotation of polarization by 90 degrees and the condition of θ=90° can be realized.

Another way to rotate the linearly polarized light by 90 degrees is by applying a voltage to a liquid crystal. FIG. 4 shows a third example of the construction of the polarization controller 9. In FIG. 4, numeral 43 represents a liquid-crystal device consisting of a thin liquid-crystal layer sandwiched between optical flats made of fused silica, and 44 is a power supply for applying a voltage to the liquid-crystal device 43. The molecules of a liquid crystal are uniaxial and have birefringence of the same nature as exhibited by the half-wave plate 40 shown in FIG. 3. By applying zero volts or a specified voltage, say, 20 volts to the liquid-crystal device 43, the phase difference between the principal axes of the liquid crystal molecules can be set to either zero degrees or 180 degrees. Therefore, as in the case of using the half-wave plate 40 shown in FIG. 3, adjusting the voltage to be applied to the liquid-crystal device 43 allows the polarization to rotate by θ=0° (when zero volts are applied) and θ=90° (when 20 volts are applied). In FIG. 3, the half-wave plate 40 is mechanically rotated to realize θ=90° but this is not the case of the example under consideration and it is characterized in that θ=90° can be realized by an electrical operation.

Turning back to FIG. 1, an optical fiber 10 is connected to the exit end of the polarization controller 9. Numeral 11 represents a photocoupler having four ports 11a–11d and the other end of the optical fiber 10 is connected to the port 11a. An end of an optical fiber 12 is connected to the port 3c of the photocoupler 3. Numeral 13 represents a photocoupler having three ports 13a–13c and the other end of the optical fiber 12 is connected to the port 13a. An optical fiber 14 is connected to the port 13b of the photocoupler 13. Numeral 15 represents a collimator lens preset to have a focal position at the end 14a of the optical fiber 14. Numeral 16 represents a reflector mirror for reflecting the light incident via collimator lens 15 and it is mounted on a stage (not shown) for adjusting the distance to the collimator lens 15. An end of an optical fiber 16a is connected to the port 13c of the photocoupler 13.

The other end of the optical fiber 16a is connected to the port 11b of the photocoupler 11. The photocoupler 11 combines the input light to the port 11a with the input light to the port 11b and issues two beams that exit from the ports 11c and 11d in a specified intensity ratio (say, 1:1). The optical fibers 17 and 18 are connected to the ports 11c and 11d, respectively; the light travelling through optical fiber 17 is subjected to photoelectric conversion by a light-receiving device 19 and the light travelling through the optical fiber 18 is subjected to photoelectric conversion by a light-receiving device 20. Numeral 21 represents a differential amplifier which amplifies the difference between the electrical signals output from the light-receiving devices 19 and 20.

Figure 5:
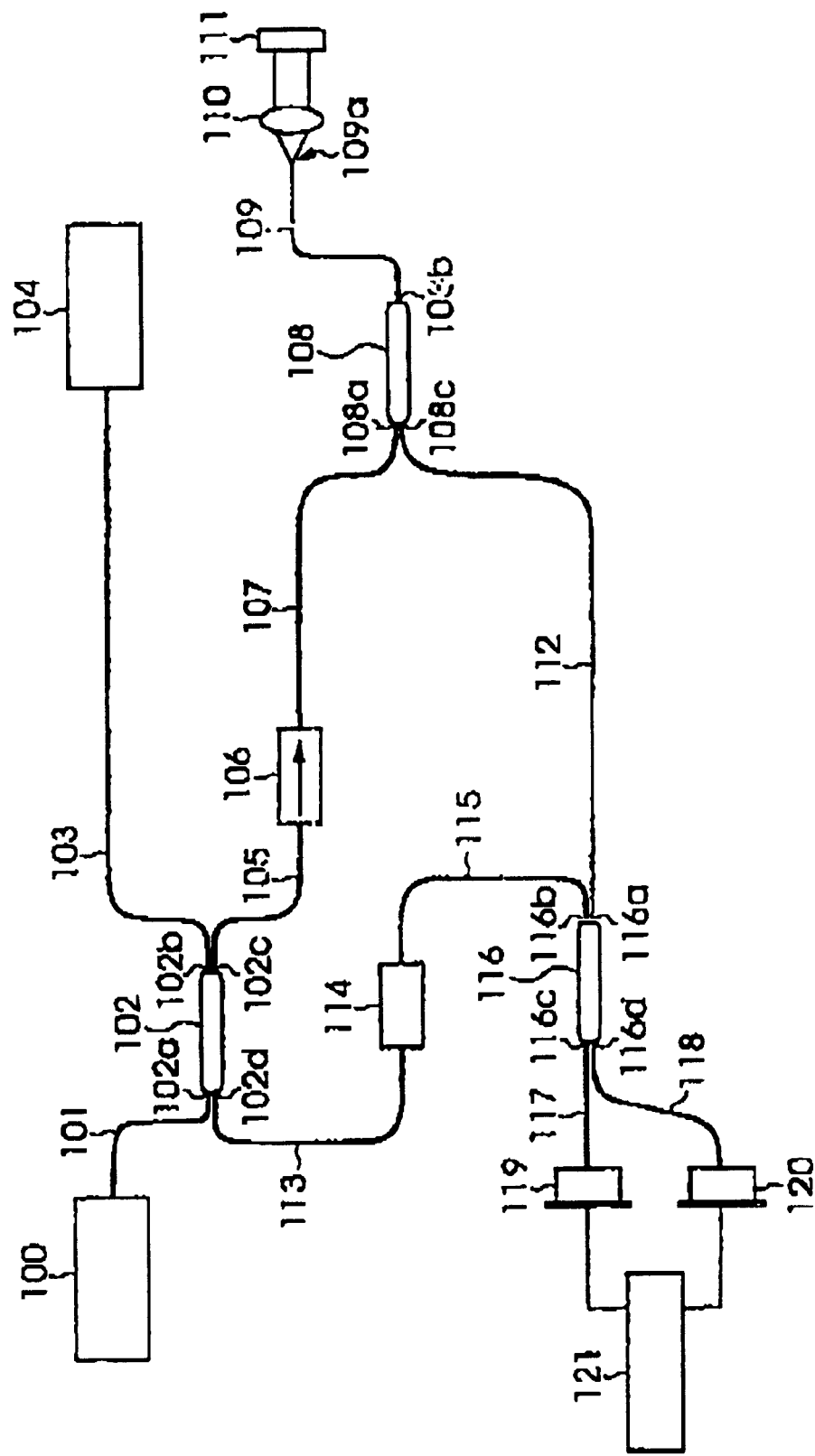
FIG. 5 is a block diagram showing an outline for the construction of a conventional low-coherence reflectometer.

It should be noted here that the low-coherence light source 1, optical circuit 7 to be measured, polarization controller 9, photocoupler 11, photocoupler 13, collimator lens 15, reflector mirror 16, light-receiving device 19, light-receiving device 20 and differential amplifier 21 which are shown in FIG. 1 are optical devices that are respectively the same as the low-coherence light source 100, optical circuit 104 to be measured, polarization controller 114, photocoupler 116, photocoupler 108, collimator lens 110, reflector mirror 111, light-receiving device 119, light-receiving device 120 and differential amplifier 121 which are shown in FIG. 5.

The low-coherence reflectometer having the above-described construction according to an embodiment of the invention operates as follows. First, the low-coherence light issuing from the low-coherence light source 1 is split by the photocoupler 2 and one branch of the coupler output is picked up as the measuring light DL and launched into the photocoupler 5 at the port 5a via the optical fiber and thence launched into the optical circuit 7 via the optical fiber 6. The reflected light RL produced in the optical circuit 7 is input to the port 5b of the photocoupler 5 via the optical fiber 6 and exits from the port 5c of the photocoupler 5. The reflected light emerging from the photocoupler 5 passes through the polarization controller 9 and is input to the port 11a of the photocoupler 11 via the optical fiber 10.

The other branch of the output light from the photocoupler 3 travels through the optical fiber 12 as local oscillator light KL and is input to the port 13a of the photocoupler 13 via the optical fiber 12. The local oscillator light KL passes through the photocoupler 13 and optical fiber 14 and exits from its end 14a; the emerging light is converted to parallel light by the collimator lens 15 and incident on the reflector mirror 16. The local oscillator light KL is then reflected by reflector mirror 16, converged by the collimator lens 15 and launched into the optical fiber 14 at its end 14a. The local oscillator light KL entering the optical fiber 14 travels through the photocoupler 13 and the optical fiber 16a in that order and is input to the port 11b of the photocoupler 11.

The photocoupler 11 combines the reflected light RL input to the port 11a with the local oscillator light KL input to the port 11b. If the optical paths of the measuring light and the reflected light RL coincide with the optical path of the local oscillator light KL, interference occurs within the photocoupler 11. The respective branches of the combined light are subjected to photoelectric conversion by the light-receiving devices 19 and 20 and the difference between the electrical signals obtained by photoelectric conversion in the light-receiving devices 19 and 20 is taken by the differential amplifier 21, whereupon the intensity noise of the light is cancelled out to provide better sensitivity. Note that part of the reflected light RL from the optical circuit 7 is output from the port 5a of the photocoupler 5 whereas part of the local oscillator light KL is output from the port 13a of the photocoupler 13; these are input to the photocoupler 3 and combined together. However, this will not interfere with the measurement since the reflected light RL input to the port 11a of the photocoupler 11 has not combined with the local oscillator light KL and the local oscillator light KL input to the port 11b has not combined with the reflected light RL.

If the stage (not shown) is moved so that the reflector mirror 16 is moved along the optical axis at uniform speed to change the pathlength of the local oscillator light KL issuing from the photocoupler 13, the amount of group retardation of the local oscillator light KL is changed. Hence, for each position of the reflector mirror 16, the polarization controller 9 is operated to set the state of polarization of the reflected light to linear polarization at $\theta=0°$ (as being parallel to the paper) and at $\theta=90°$ (as being perpendicular to the paper) and the intensities of the corresponding beat signals $I_0$ and $I_{90}$ are measured with the differential amplifier 21 and their sum $I_0+I_{90}$ is calculated; in this way, the optical power of the reflected light for each point in the optical circuit 7 can be measured independently of the state of polarization of the reflected light RL and the local oscillator light KL, thus making it possible to measure the reflectance distribution.

Figure 6:
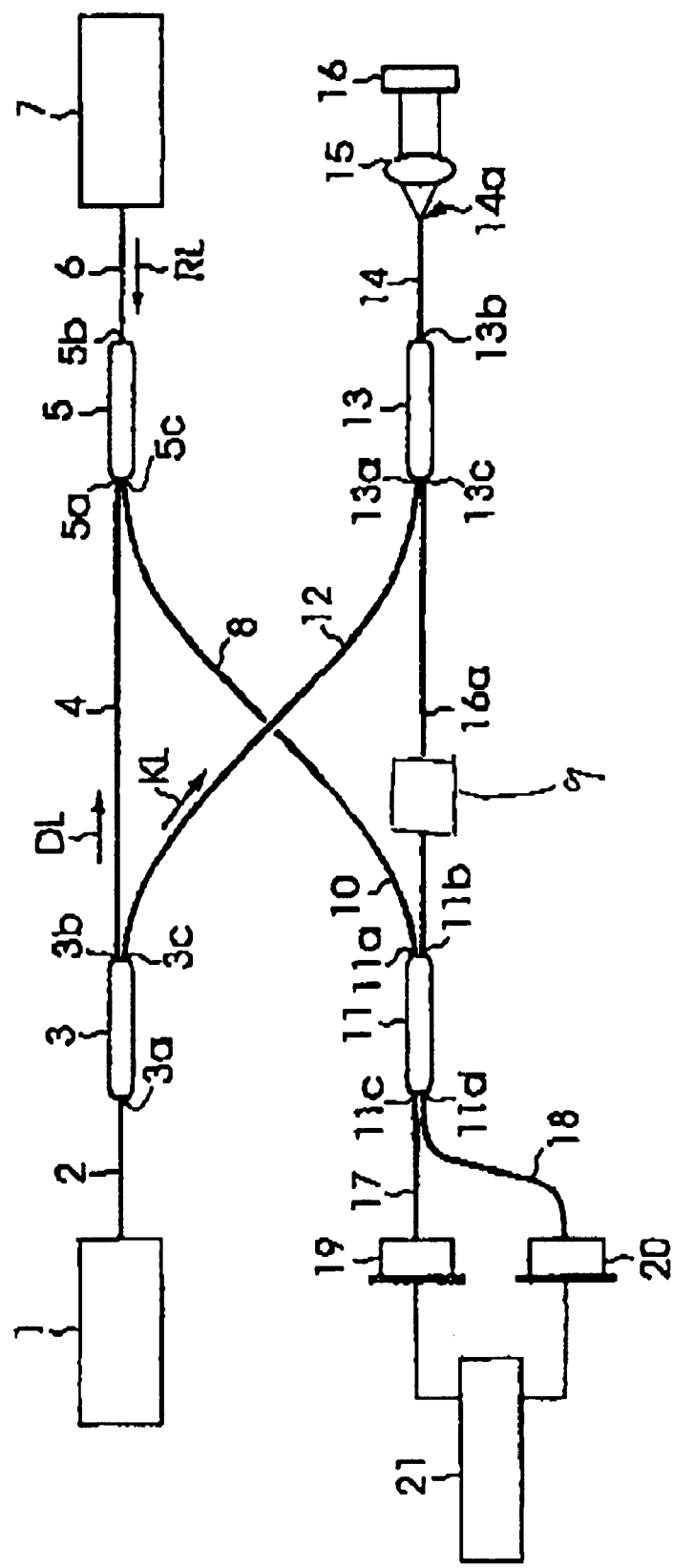
FIG. 6 is a block diagram showing a variation of the embodiment of the invention.

While the low-coherence reflectometer according to the embodiment of the invention has been described above, it should be understood that the invention is by no means limited to the above-described embodiment and that various desired alterations are possible without departing from the spirit and scope of the invention. For instance, in the above-described embodiment, polarization controller 9 is provided between the photocouplers 5 and 11 in order to control the state of polarization of the reflected light RL. If desired, the polarization controller 9 may be provided between the photocouplers 13 and 11 in order to control the state of polarization of the local oscillator light KL, as shown in FIG. 6.

Thus, in the low-coherence reflectometer according to an embodiment of the invention, the photocoupler 5 is provided to split the reflected light RL before it reaches photocoupler 3 after being generated in the optical circuit 7, so there should be no interference with the measurement even if the reflected light RL is combined with the local oscillator light KL in an optical component other than the photocoupler 11 (e.g. photocoupler 3). This eliminates the need to provide an optical isolator that has been required by the conventional low-coherence reflectometer already described with reference to FIG. 5. As a result, the pathlengths of the measuring light DL and the reflected light RL and the optical path of the local oscillator light KL can both be shortened and the loss due to dispersion and reflection within optical fibers can be sufficiently reduced to enable correct measurements. In addition, the elimination of an optical isolator contributes to cost reduction and the simplified structure leads to an additional cutdown of the production cost.

As described above, in the present invention, the second splitting unit is provided to split the reflected light before it reaches the first splitting unit after being generated in the optical circuit to be measured, so there should be no interference with the measurement even if the reflected light is combined with the local oscillator light in an optical component other than the coupling unit. This eliminates the need to provide an optical isolator that has been required by the conventional low-coherence reflectometer.

As a result, the pathlengths of the measuring light and the reflected light and the optical path of the local oscillator can both be shortened and the loss due to dispersion and reflection within optical fibers can be sufficiently reduced to enable correct measurements. In addition, the elimination of an optical isolator contributes to cost reduction and the simplified structure leads to an additional cutdown of the production cost.

What is claimed is:

1. A low-coherence reflectometer comprising:

a light source;

a first splitter for splitting a light beam from the light source into a first split beam and second split beam;

a second splitter for inputting the first split beam from the first splitter into an optical circuit to be measured, the second splitter for splitting the first split beam reflected on the optical circuit into a third split beam and fourth split beam;

a polarization controller for controlling polarization of the third split light received from the second splitter;

a third splitter for allowing the second split beam from the first splitter to be incident on a reflector, the third splitter for splitting the second split beam reflected on the reflector into a fifth and sixth split beam; and a coupling unit for combining the third split beam controlled by the polarization controller with the fifth split beam output from the third splitter.

2. The low-coherence retlectometer according to claim 1, wherein the polarization controller sets the state of polarization in two orthogonal directions.

3. The low-coherence reflectometer according to claim 1, further comprising a stage for moving the reflector along the optical axis of the second split beam.

4. The low-coherence reflectometer according to claim 1, wherein the polarization controller comprises:

a Faraday rotator;

a coil portion for applying a magnetic field to the Faraday rotator in the propagation direction of light; and a current controller for controlling a current to the coil portion.

5. The low-coherence reflectometer according to claim 1, wherein the polarization controller comprises:

a half-wave plate; and a rotating mechanism for rotating the half-wave plate in a plane orthogonal to the optical axis.

6. The low-coherence reflectometer according to claim 1, wherein the polarization controller comprises:

a liquid-crystal device for setting a pathlength difference between the two principal axes to either zero or half the wavelength; and a power supply for adjusting the voltage to the liquid-crystal device.

7. A low-coherence reflectometer comprising:

a light source;

a first splitter for splitting a light beam from the light source into a first split beam and second split beam;

a second splitter for inputting the first split beam from the first splitter into an optical circuit to be measured, the second splitter for splitting the first split beam reflected on the optical circuit into a third split beam and fourth split beam;

a third splitter for allowing the second split beam from the first splitter to be incident on a reflector, the third splitter for splitting the second split beam reflected on the reflector into a fifth and sixth split beam;

a polarization control unit for controlling polarization of the fifth split light received from the third splitter; and a coupling unit for combining the third split beam from the second splitter with the fifth split beam controlled by the polarization control.

8. The low-coherence reflectometer according to claim 7, wherein the polarization controller sets the state of polarization in two orthogonal directions.

9. The low-coherence reflectometer according to claim 1, further comprising a stage for moving the reflector along the optical axis of the second split beam.

10. The low-coherence reflectometer according to claim 7, wherein the polarization controller comprises:

a Faraday rotator;

a coil portion for applying a magnetic field to the Faraday rotator in the propagation direction of light; and a current controller for controlling a current to the coil portion.

11. The low-coherence reflectometer according to claim 7, wherein the polarization controller comprises:

a half-wave plate; and a rotating mechanism for rotating the half-wave plate in a plane orthogonal to the optical axis.

12. The low-coherence reflectormeter according to claim 7, wherein the polarization controller comprises:

a liquid-crystal device for setting a pathlength difference between the two principal axes to either zero or half the wavelength; and a power supply for adjusting the voltage to the liquid-crystal device.

* * * * *